United States Patent [19]

Gretz

[11] 4,180,227

[45] Dec. 25, 1979

[54] NON-METALLIC SHEATHED CABLE CONNECTOR

[75] Inventor: Thomas J. Gretz, Stow, Ohio

[73] Assignee: The Scott & Fetzer Company, Bedford Heights, Ohio

[21] Appl. No.: 875,236

[22] Filed: Feb. 6, 1978

[51] Int. Cl.[2] .......... F16M 13/00

[52] U.S. Cl. .......... 248/56; 248/74 PB; 174/135; 174/153 G; 403/197

[58] Field of Search .......... 248/27.3, 56, 74 PB; 174/135, 153 G; 403/197, 238, 346, 392, 400; 285/158, 217

[56] References Cited

U.S. PATENT DOCUMENTS

| | | | |
|---|---|---|---|
| 2,895,003 | 7/1959 | Rapata | 174/153 G |
| 3,290,430 | 12/1966 | Klumpp et al. | 174/153 G |
| 3,493,205 | 2/1970 | Bromberg | 248/56 |
| 3,667,710 | 6/1972 | Moody et al. | 248/74 PB |
| 3,701,505 | 10/1972 | Klumpp | 248/56 |
| 3,751,579 | 8/1973 | Nojiri | 248/56 X |
| 3,788,582 | 1/1974 | Swanquist | 248/56 |
| 3,889,909 | 6/1975 | Koscik | 248/56 |
| 4,000,875 | 1/1977 | Jemison et al. | 248/56 |

OTHER PUBLICATIONS

Advertisement: Bush–Grip Connector, undated but prior to applicant.

Advertisement: Tubing Control Valve, undated but prior to applicant.

*Primary Examiner*—William H. Schultz

*Attorney, Agent, or Firm*—Pearne, Gordon, Sessions

[57] ABSTRACT

A sheath cable connector for Romex type non-metallic sheathed cable includes a bushing portion and cable gripping portion, the latter being of the hose clamp type, but arranged so that spring deflection of one gripping member during clamping is maintained by predominantly tensile reactive forces in the other gripping member to thereby establish a latching engagement between the two gripping members that is relatively positive although readily releasable. The cable is gripped at three axially or longitudinally spaced points in a manner that provides a resilient clamping action. As the tightness of clamping is increased, the tightness of latching engagement between the clamping members also tends to increase.

8 Claims, 4 Drawing Figures

NON-METALLIC SHEATHED CABLE CONNECTOR

There has long been a continuing need for improved sheath cable connectors for Romex type non-metallic sheathed cable of the type widely used for example in home wiring. In recent years, various designs of plastic connectors have been proposed. Four such designs are shown in U.S. Pat. 3,701,505 to Klumpp. In one design screw fasteners are required. The other three designs do not appear to provide clamps that are readily releasable.

All the Klumpp designs grip the cable in a relatively rigid or non-resilient manner so that there is little spring-back in the grip and the possibility of loosening or slippage may increase upon sideward deflection or alternate stiffening and relaxation or swelling and shrinking of the cable under various mechanical loads or under alternating ambient conditions such as freezes and thaws or humid and dry spells. The same appears to apply to the various designs shown in U.S. Pat. No. 4,000,875 to Jemison.

A connector comprising a split bushing and gripping fingers has been marketed by Blackhawk Industries but the cable grip of such device is believed to rely in part on cable tension and to be relatively impositive.

Hose clamps have of course long been known in applications requiring the pinching-off or regulated constriction of a hollow flexible conduit. One-piece plastic hose clamps have been provided under the trademark Dura-Clamp wherein directly opposed protuberances on a pair of gripping members pinch-off the hose. However there is relatively little spring-back in the grip provided by these directly opposed protuberances. In the Dura-Clamp device, latching engagement between the clamping members is maintained by spring deflections of one member in such a direction as to be resisted by compressive reaction forces in the other member, and the latching engagement between the members is maintained in a relatively impositive manner.

In the present invention a resilient clamping action is provided which is more accommodative of varying cable conditions such as sidewall deflections, stiffening and relaxing, or swelling and shrinking. Latching engagement between the clamping members is maintained by spring deflection of one member in such a direction as to be lightly resisted by tensile reactive forces in the other member to thereby maintain latching engagement between the members in a relatively positive manner but in such a way that the connector is readily manually releasable. More generally, the present invention provides a sheath cable connector that compares favorably with the prior art in providing economy of manufacturing materials, compatability with established methods of mass manufacture, reliability of operation under varying circumstances, ease of use, durability, and ready releasability when desired.

These and other features and advantages of the invention are more fully brought out in the following description, by way of example, of one embodiment.

In the drawings, FIG. 1 is a side elevation of a connector exemplifying the invention.

Figure 1:
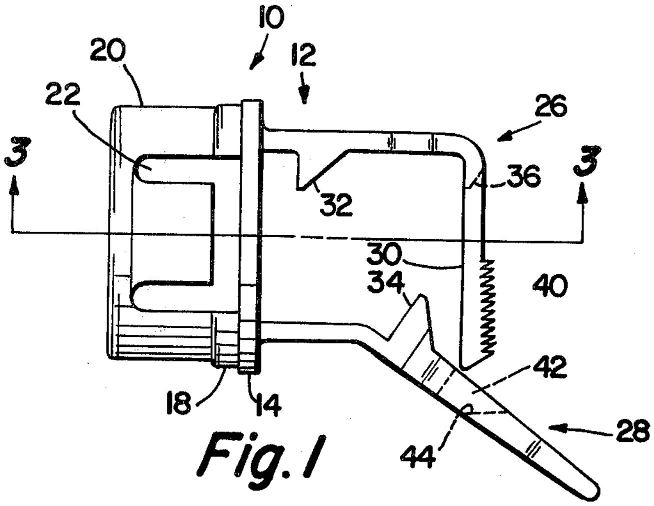

The illustrated cable includes a bushing portion generally indicated at 10 and a gripping portion of a type similar to a hose clamp and generally indicated at 12. An axially extending opening 11 (FIG. 3) in the bushing portion 10 is adapted to receive a cable such as the cable 13 seen in FIG. 4.

The bushing portion is adapted to be inserted and locked in a suitable mounting aperture such as a knockout hole in an electrical junction box. The flange 14 seats against the outside of the wall of the junction box or the like in which the receiving aperture is formed. The detents 16 snap back outwardly to their normal position to engage the inside of the wall following insertion of the bushing portion into the mounting aperture, the detents having been forced radially inwardly during insertion by wedging engagement with the edges of the mounting aperture. Shoulder or lip means 18 are sized to snugly engage the edges of the aperture. A nose portion 20 acts as a guide for insertion and forms a body to which the detents 16 are resiliently hinged. To accommodate the hinging movement, the free sides and ends of the detents 16 are seperated from the nose portion 20 and from the shoulder or lip means 18 by cutouts 22.

The gripping portion 12 comprises first and second gripping members 26 and 28 (FIG. 1). As shown, the first and second gripping members initially extend generally axially from one end of the bushing. The first gripping member then extends transaxially with its free end 30 engageable in latching relationship with the second gripping member 28 as more fully described below.

The gripping members 28 and 26 have cable gripping means thereon in the form of gripping teeth 32, 34, and 36 distributed along the axial direction. The two endmost gripping teeth 32 and 36 are associated with the first gripping member 26 and the intermediate gripping tooth 34 is associated with the second gripping member 28. The gripping tooth 36 comprises an edge of a window 38 (FIG. 2) formed in the transaxially extending portion of the first gripping member 26.

Figure 2:
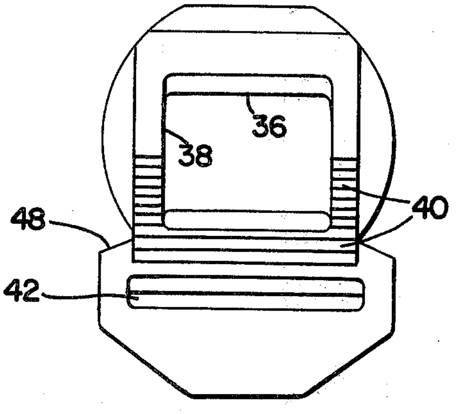
FIG. 2 is an end elevation of the same connector.
Figure 4:
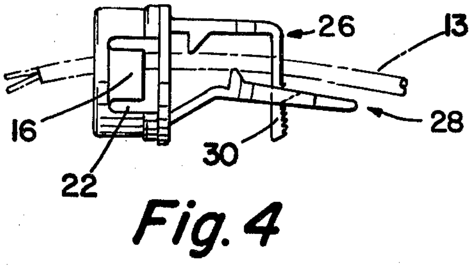
FIG. 4 is a view similar to FIG. 1 but on a reduced scale and showing the connector latched in gripping engagement with a cable.

Serrations 40 are formed on the free end 30 of the first gripping member and extend partly along each side of the window 38, as shown (FIG. 2). An aperture 42 is formed in the second gripping member 28 for receiving the free end 30 of the first gripping member. The edge 44 (FIG. 1) of aperture 42 engages the serrations 40 to establish latching engagement of the first gripping member 26 by the second gripping member 28, as illustrated in FIG. 4, to thereby latch the gripping members into gripping relationship with a cable 13, as illustrated. During this latching engagement there is light spring loading of the free end 30 from its neutral or unloaded position since it is slightly deflected from neutral toward the bushing portion 10. This spring loading is maintained by a light reactive tensile force in the second gripping member 28. As the tightness of the grip on the cable 13 is increased by drawing the free end 30 further into the slot or aperture 42, the moment arm of the reactive tensile force, with respect to the hinge point of free end 30, becomes smaller, inducing a higher reactive force. Accordingly as the tightness of clamping is increased, the tightness of latching engagement also tends to increase.

The spring loading of the latching engagement assures that the latching engagement will be maintained in a positive manner until such time as the deflection of free end 30 is manually momentarily increased to override and relieve the reactive tensile force in the second gripping member 28 to allow unlatching and thereby permit release of the grip on the cable 13.

The first gripping member 26 may be flared as at 46 (FIG. 3) to allow the windowed free end 30 to be relatively wide, and the second gripping member 28 may be flared to an even greater width, as at 48 (FIG. 2), to allow the aperture 42 to be sufficiently wide to receive the free end 30.

Figure 3:
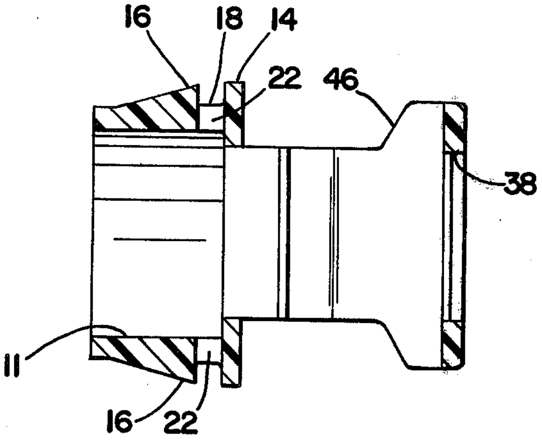
FIG. 3 is a section taken on the plane of line 3—3 in FIG. 1.

With the illustrated connector, when a cable is gripped as seen in FIG. 3, the gripping teeth are not in direct opposition. The clamping action is resilient but tends to persist and remain stable under changing conditions such as sideward deflection of the cable, or alternate stiffening and relaxation or swelling and shrinking.

Connectors embodying the invention may vary in details from the illustrative example described above. The invention is not limited to the particulars of this example but is defined by the following claims.

What is claimed is:

1. A one-piece plastic sheath cable connector including a bushing portion, means on the bushing portion for locking it in an aperture, an axially extending opening in the bushing portion through which a cable may be received, first and second strain relief gripping members on opposite sides of the central opening and initially extending generally axially from one end of the bushing, the first gripping member then extending transaxially substantially across a projection of the bushing member with the free end of the first gripping member being engageable in latching relationship with the second gripping member, a window in the transaxially extending portion of the first gripping member for receiving the cable, three cable-gripping teeth distributed along the axial direction, the two endmost gripping teeth being associated with one gripping member and the intermediate gripping tooth being associated with the other gripping member.

2. A connector as in claim 1, the two endmost gripping teeth being associated with the first gripping member.

3. A connector as in claim 2, one of the endmost gripping teeth comprising an edge of said window in the transaxially extending portion of the first gripping member.

4. A connector as in claim 1, said free end of the first gripping member being deflected toward the bushing member in the manner of a loaded spring when the first gripping member is engaged in latching relationship with the second gripping member, said spring loading increasing in force with increasingly tight engagement of a cable by the gripping members.

5. A connector as in claim 4, the second gripping member having an aperture for receiving said free end of the first gripping member during said latching engagement, serrations on said free end, an edge of said aperture releasably engaging said serrations on said free end of the first gripping member to establish such latching engagement and releasably constrain the free end in said springingly biased condition.

6. A one-piece sheath cable relief connector including a bushing portion, means on the bushing portion for locking it in an aperture, an axially extending opening in the bushing portion through which a cable may be received, first and second strain relief gripping members on opposite sides of the central opening and initially extending generally axially from one end of the bushing, the first gripping member then extending transaxially with its free end engageable in latching relationship with the second gripping member, a window in the transaxially extending portion of the first gripping member for receiving the cable, three cable-gripping teeth distributed along the lengths of the gripping members, one of the two endmost gripping teeth comprising an edge of said window in the transaxially extending portion of the first gripping member and the other of the two endmost gripping teeth also being associated with the first gripping member, the intermediate gripping tooth being associated with the second gripping member, the second gripping member having an aperture for receiving said free end of the first gripping member during said latching engagement, serrations on the free of the first gripping member, an edge of said aperture releasably engaging said serrations to establish said latching engagement, the free end of the first gripping member being deflected toward the bushing in the manner of a locked spring during said latching engagement, said spring deflection being maintained by predominately tensile reactive forces in said second gripping member.

7. A one-piece plastic sheath cable connector including a bushing portion, means on the bushing portion for locking it in an aperture, an axially extending opening in the bushing portion through which a cable may be received, cable gripping means extending from one side of the bushing portion and comprising first and second gripping members having cable gripping means thereon, the first gripping member extending axially and then transaxially substantially across a projection of the bushing member with the free end of the first gripping member engageable in latching relationship with the second gripping member when said members grip or cable, the free end of the first gripping member being deflected toward the bushing in the manner of a loaded spring during said latching engagement, said spring deflection being maintained by predominately tensile reactive forces in said second gripping member.

8. A connector as in claim 7, said latching engagement being releasable by manually momentarily increasing said deflection to override and relieve said tensile reaction forces to allow unlatching and thereby permit release of the grip on the cable.

* * * * *